Oct. 7, 1930.  W. H. KRUG ET AL  1,777,727
HORSESHOE CALK
Filed Nov. 14, 1929
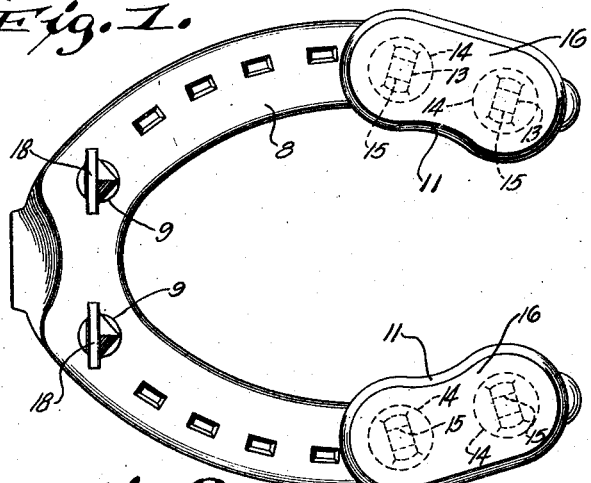
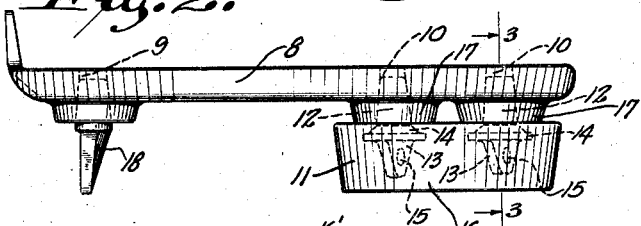
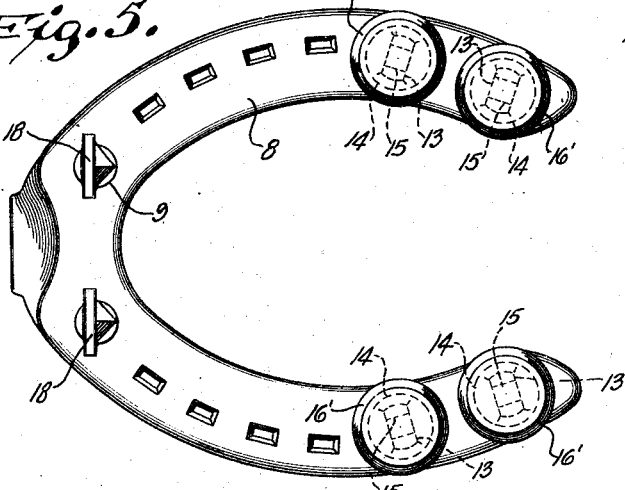
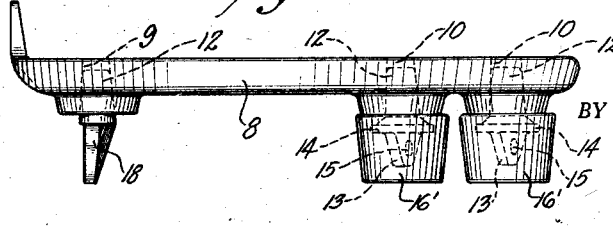
INVENTORS
William H. Krug &
Carl G. Akerberg
BY Morsell, Keeney & Morsell
ATTORNEYS Patented Oct. 7, 1930

1,777,727

UNITED STATES PATENT OFFICE

WILLIAM H. KRUG, OF TAYCHEEDA, AND CARL G. AKERBERG, OF OSHKOSH, WISCONSIN

HORSESHOE CALK

Application filed November 14, 1929. Serial No. 407,153.

This invention relates to improvements in horseshoe calks, and more particularly to a detachable horseshoe calk.

It is one of the objects of the invention to provide a resilient horseshoe calk provided with a fixed metallic stem or shank which is readily detachable from a horseshoe without removing the shoe from the animal's hoof, the resilient calk serving the purpose of preventing slipping and being especially adapted for summer use.

A further object of the invention is to provide a resilient horseshoe calk of the detachable type which will not work loose from the shoe when in use, but which will, in practice, actually become more firmly secured in the horseshoe when subjected to pressure in use.

A further object of the invention is to provide a resilient, detachable horseshoe calk wherein the metallic stem member is securely anchored within the resilient pad member in such a manner that it cannot turn on the shank member nor work loose with respect thereto.

A further object of the invention is to provide a resilient, detachable horseshoe calk wherein the portion of the metallic shank embedded in the resilient pad is formed with an opening to receive therethrough material of the resilient pad and thereby anchor the pad to the shank.

A further object of the invention is to provide a detachable, padded horseshoe calk which is of very simple construction, is inexpensive to manufacture, is easily mounted on a horseshoe and removed therefrom for replacement, is strong and durable, and is well adapted for the purposes described.

With the above and other objects in view the invention consists of the improved detachable, resilient horseshoe calk and its parts and combinations as set forth in the claims, and all equivalents thereof.

In the accompanying drawing in which the same reference characters indicate the same parts in all of the views:

Fig. 1 is an inverted plan view of a horseshoe provided with the improved detachable resilient calks;

Fig. 2 is a side view thereof;

Fig. 3 is an enlarged detail sectional view taken on line 3—3 of Fig. 2;

Fig. 4 is an enlarged detail sectional view taken on line 4—4 of Fig. 3;

Fig. 5 is an inverted plan view of a horseshoe provided with detachable resilient calks of a slightly modified form; and Fig. 6 is a side view thereof.

Referring now more particularly to the drawings, with special reference to the form of the invention illustrated in Figs. 1 to 4 inclusive, it will appear that the numeral 8 indicates a horseshoe having in its front portion a pair of spaced, upwardly projecting tapered openings 9, and two pairs of similarly shaped and spaced openings 10 in its rear or heel portion.

The improved detachable resilient calks are adapted for removable insertion in pairs of openings 10 and also in the pair of openings 9, if desired, but as illustrated the padded calks are shown only in the openings 10. Each calk 11 comprises a pair of spaced metallic members having tapered shanks 12, round in cross-section, comparatively flat and downwardly tapered stems 13, and medial enlarged flared or anchoring portions 14. Each stem portion is provided with a relatively large circular opening 15 extending therethrough. The stem and flared portions of a pair of metallic members are embedded in a pad 16 of rubber or other similar resilient material, as shown in Figs. 1 to 4 inclusive, and said pad is shaped as shown in said figures and underlies a substantial portion of a side of a heel portion of the horseshoe 8. When the stem and flared portions of each metallic member are embedded in a pad 16 the material of the pad enters the opening 15 of the stem portion, completely filling the same and extending therethrough, with the result that this arrangement serves to anchor the pad on the stem. It will be observed particularly from Figs. 2 and 4 that the stem portion of each metallic member is relatively thin or flat as compared with the width of the face of a stem portion and this shape of the stem portion will prevent the pad from turning thereon. Furthermore, the specific shape of each stem portion of the metallic member in conjunction with the opening 15 therein filled with the material of the pad are instrumentalities effective in insuring the positive permanent securement of the pad on the metallic members.

It will therefore be seen that in the principal form of the invention each padded calk includes an elongated resilient pad with a pair of spaced metallic members embedded therein, and the tapered shanks of said members are driven into pairs of adjacent tapered openings 10 in the horseshoe proper and wedgingly engage therein. As so positioned the top surfaces of the resilient pads 16 engage boss portions 17 depending from the horseshoe adjacent the openings 10.

If resilient pads or calks are not used in the front portion of the horseshoe, metallic calks 18 may be driven into the openings 9, but, if desired, said metallic calks 18 may be readily replaced by one of the double-padded calks such as was described for the rear or heel portion of the horseshoe.

The improved form of padded or resilient calks will not work loose from the horseshoe when in use. The lower end portions of the stems 13 of each calk terminate quite close to the lower outer surface of the resilient pad 16, and hence when the horseshoe is secured onto a horse's hoof, in walking, there will be a direct pressure applied to the outer or lower ends of the stems, so that at all times, during use, the pressure on said stem portions will tend to force the shank portions of the metallic members of the calks into the tapered openings 10. Also, because of the specific formation of the stem and flared portions of each metallic member, there can be no possibility of the pad becoming loose from the metallic members nor working free thereon. When the improved calks become worn and it is desired to replace the same, they may be readily removed from the horseshoe without the necessity of removing the shoe from the animal's hoof. This is accomplished by the application of a tool applied between the upper surface of the calk and the under surface of the horseshoe, by which means the calk may be pried outwardly so as to cause a withdrawal of the tapered shank portions 12 from the tapered openings 10 of the shoe.

In Figs. 5 and 6 a slight modification of the invention has been illustrated wherein the padded calks are of single formation rather than of double formation as in the form of the invention described above. From Figs. 5 and 6 it will be seen that each calk includes but one metallic member having a tapered shank portion 12 wedgingly engaged in an aperture 10 of the horseshoe 8, and an outer stem 13 with an intermediate flared portion 14. Both the stem and flared portions are embedded or vulcanized into a resilient pad 16' of circular form in cross-section. The formation of said stem portions 13 is similar to that described in connection with the principal form of the invention and said portions are formed with openings 15 through which material of the pad extends to anchor the pads on the stems.

Said single, circular padded calks are applied as shown and they may also be employed in the forward openings 9 of the horseshoe in lieu of the metallic calks 18, if desired.

It will therefore be seen that the present invention contemplates the provision of a resilient horseshoe calk of either single or double formation, which is readily removable from a horseshoe without the necessity of removing the shoe from the animal's hoof. Also, in use the calk is so arranged that the tendency is for it to become firmly engaged by the horseshoe rather than to work loose, and the mounting of the resilient pad on the metallic member or members of the calk is such that the pad cannot work loose therefrom or thereon. The improved horseshoe calk is also simple, novel, and inexpensive to manufacture, and is well adapted for the purposes set forth.

What is claimed as the invention is:

1. A padded horseshoe calk, comprising a metallic member having an inner shank portion removably lodgeable within a horseshoe opening and also having an outer apertured stem portion and an intermediate anchoring portion, and a resilient pad member secured onto and covering said stem and anchoring portions, a portion of said pad entering the aperture of said stem portion, said stem portion being shaped so as to prevent the pad from turning thereon.

2. A padded horseshoe calk, comprising a metallic member having an inner shank portion removably lodgeable within a horseshoe opening and also having an outer apertured stem portion and an intermediate anchoring portion, and a resilient pad member secured onto and covering said stem and anchoring portions, a portion of said pad entering the aperture of said stem portion, said stem portion being shaped so as to prevent the pad from turning thereon and terminating at its outer end relatively close to the lower surface of the pad so as to be the recipient of pressure applied to the lower surface of the pad.

3. The combination with a horseshoe having an opening therein, of a removable padded calk, comprising a metallic member having a shank removably inserted in said opening and also having an apertured stem and an intermediate flared anchoring portion, and a resilient pad securely mounted on and enclosing said anchoring and stem portions and having portions of its material entering the aperture of the stem, said stem being shaped so as to prevent turning of the pad thereon, a portion of the pad being interposed between the horseshoe and said flared anchoring portion whereby said horseshoe is cushioned.

4. A padded horseshoe calk, comprising a metallic member having an inner shank portion removably lodgeable within a horseshoe opening and also having an outer stem portion and an intermediate anchoring portion, and a resilient pad member secured onto and covering said stem and anchoring portions, said stem portion being shaped and formed so as to anchor the pad thereon and to prevent movement of the pad thereon and terminating at its outer end relatively close to the lower surface of the pad member so as to be the recipient of pressure applied to the lower surface of the pad.

In testimony whereof, we affix our signatures.

WILLIAM H. KRUG.
CARL G. AKERBERG.